United States Patent [19]

Wenskus, Jr. et al.

[11] Patent Number: 5,200,126
[45] Date of Patent: Apr. 6, 1993

[54] METHOD AND APPARATUS FOR MONITORING THE STABILITY OF THE INJECTION MOLDING PROCESS BY MEASUREMENT OF SCREW RETURN TIME

[75] Inventors: James J. Wenskus, Jr., Rochester; Alan B. Miller, Scottsville, both of N.Y.

[73] Assignee: Eastman Kodak Company, Rochester, N.Y.

[21] Appl. No.: 619,783

[22] Filed: Nov. 29, 1990

[51] Int. Cl.$^5$ .............................................. B29C 45/76
[52] U.S. Cl. ......................... 264/40.1; 425/136; 425/145; 425/155; 425/169
[58] Field of Search ............. 264/40.1, 40.4, 40.5, 264/328.1, 328.17; 425/135, 136, 140, 145, 148, 155, 169

[56] References Cited

U.S. PATENT DOCUMENTS 3,693,946 9/1972 Merritt .
3,797,808 3/1974 Ma et al. .
3,825,235 7/1974 Schwertfeger .
4,146,601 3/1979 Bishop ................................ 264/40.1
4,904,172 2/1990 Buja ................................... 425/140

FOREIGN PATENT DOCUMENTS 62-279918 12/1987 Japan ................................ 264/40.1

Primary Examiner—Jill L. Heitbrink
Attorney, Agent, or Firm—Joshua G. Levitt; Charles E. Snee; Robert E. Heslin

[57] ABSTRACT

A method and an apparatus for monitoring the process stability of an injection molding machine having a reciprocating screw engaged in the plasticating of a moldable material in preparation to its being introduced into the mold cavity. The invention involves the measurement of the duration of the operation of the screw engaged in the plasticating of the moldable material and includes the analysis of this duration over a period of time thus providing the supervisor with the necessary information to determine whether the machine/process is meeting or deviating from the desired operating requirements.

36 Claims, 2 Drawing Sheets

METHOD AND APPARATUS FOR MONITORING THE STABILITY OF THE INJECTION MOLDING PROCESS BY MEASUREMENT OF SCREW RETURN TIME

TECHNICAL FIELD

This invention relates to the field of injection molding and, more particularly, it relates to an apparatus and a process for monitoring the stability of the operation of an injection molding machine by measurement of screw return time.

BACKGROUND ART

In the injection molding art, it is desirable to monitor the process repeatability of the injection molding machine in a "real time" manner to discover the existence of perturbations that may adversely affect product quality. Current technology requires the addition of transducers of one type or another, plus the appropriate signal conditioning equipment to measure one or more process parameters for this purpose. While good results have been obtained using this approach, several factors including the cost of the required hardware, the fragility of the transducers, the calibration required when product changes occur and the maintenance costs resulting from abuse during normal production operations have discouraged the widespread use of such monitoring systems by injection molding operators.

We have found an alternative process stability monitoring method and apparatus requiring no transducers nor any significant additional hardware. It is based upon our discovery that the operation of the plasticating screw found in virtually all injection molding machines varies in a measurable way with all common process perturbations encountered in the injection molding process. In most injection molding machines, the time required for the screw to plasticate and position material for the next shot "floats" while other machine parameters occur for fixed times. As a result, the screw recovery time is a bulk indicator, the duration of which is affected by the sum total of many operating parameters such as injection pressure, holding pressure, back pressure, melt temperature, injection time, holding time, cycle time, the material being plasticated and the mechanical condition of key components in the molding machine. Our experiments have shown that perturbations in these parameters produce measurable affects in screw recovery time. Thus, by tracking this metric statistically and analyzing it, using any of a plethora of existing statistical methods and displays, processing anomalies can be detected at levels below which the product may be affected. And, because of the time frame involved, identification of the cause may frequently be determined by a simple inspection of a display of measured screw recovery time values.

The method and apparatus of this invention is relatively inexpensive and simple to implement because screw recovery time is easily measured by electrically monitoring a pair of contact points which are usually easily accessible on an injection molding machine. Moreover, these same contact points could be used to obtain the same data which is usually fed to a management computer which presently monitors a different contact closure. Thus, by shifting the management computer connection to the contacts monitored for the screw recovery time metric, it becomes possible to receive additional information over the same pair of wires.

It is, therefore, an object of this invention to provide a method and an apparatus for monitoring the stability of the operation of an injection molding machine.

It is a further object of this invention to provide a method and an apparatus of the type recited which will be simple in design, low in cost and easy to implement on existing injection molding equipment.

SUMMARY OF THE INVENTION

Briefly stated, the apparatus of this invention for monitoring the stability of the operation of a continuously operating injection molding machine includes means for generating an electrical signal when the plasticating screw is rotating, means for separately measuring and storing the time duration value of said signal during selected molding cycles, means for comparing each measured time duration value with predetermined upper and lower time duration limits and means for initiating an alarm or taking other appropriate action when the measured time duration value falls outside the predetermined limits. The upper and lower operating limits are computed from a plurality of the stored time duration values and the system may include means for graphically displaying measured time duration values with respect to a computed mean value.

Also briefly stated, the method of this invention includes the steps of generating an electrical signal when the plasticating screw is rotating, separately measuring the time duration value of said electrical signal during selected molding cycles, comparing each measured time duration value with predetermined upper and lower time duration limits and initiating an alarm or taking other appropriate action when a measured time duration value falls outside the predetermined limits. The predetermined limits may be computed from a plurality of measured time duration values and the method may include graphically displaying the plurality of stored values with respect to a computer mean value.

DESCRIPTION OF THE PREFERRED EMBODIMENT

Figure 1:
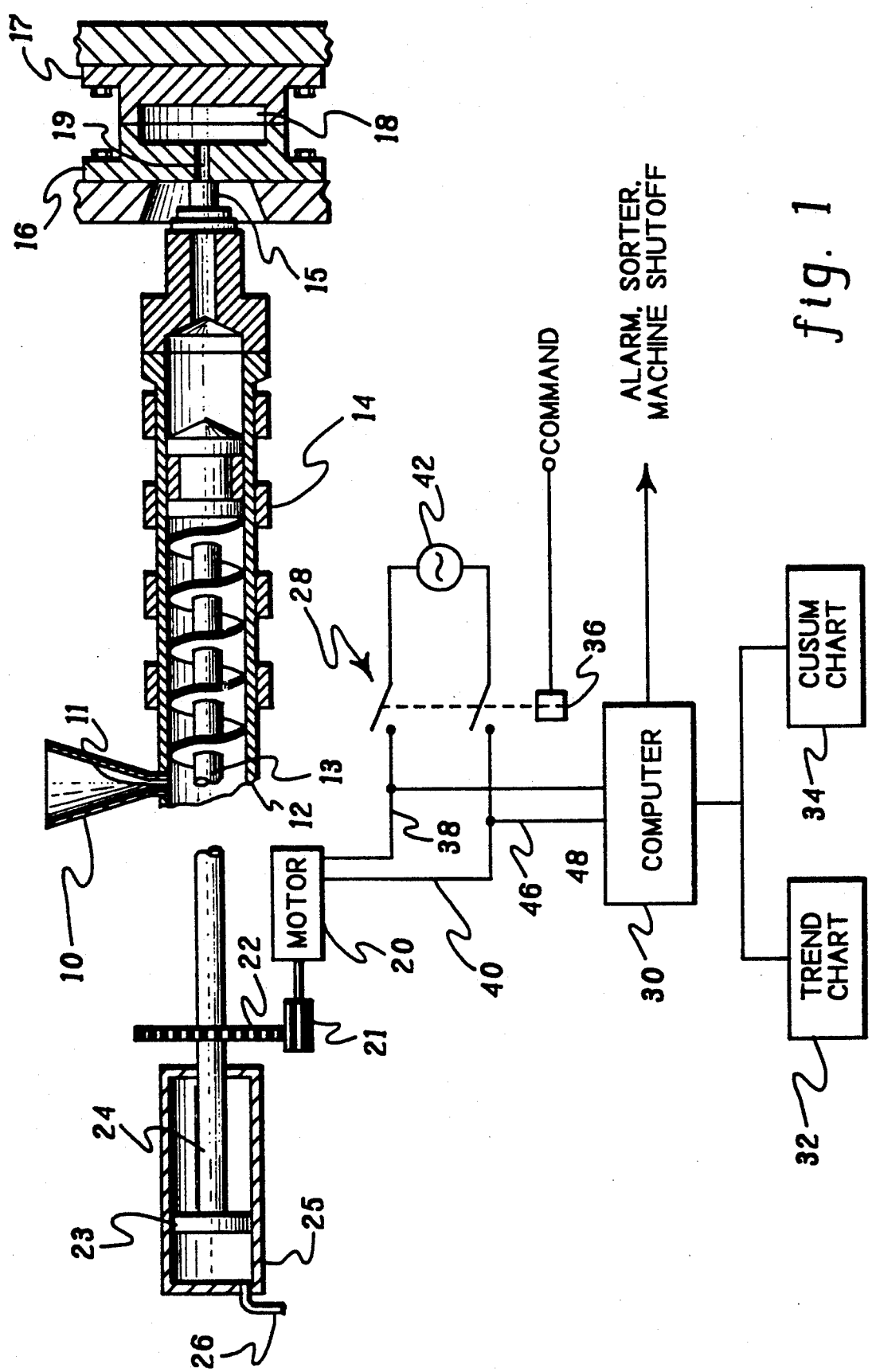
FIG. 1 is a schematic view showing a portion of the plastication system of an injection molding machine to which the monitoring system of the present invention has been applied.

Referring now to the drawings and particularly to FIG. 1 thereof, there is shown a portion of the plastication system of an injection molding machine. The material to be plasticated is placed in a hoper 10 which is positioned above an aperture 11 in a cylindrical barrel 12 within which a plasticating screw 13 is rotatably and translatably positioned. Barrel 12 can include external heating means in the form of band heaters 14 to add heat to the material being plasticated. The forward end of barrel 12 includes a discharge orifice 15 which can also include a shut-off valve (not shown) to control the flow of the plasticated material from the barrel. Adjacent the forward end of barrel 12 is a pair of mold halves 16,17 which together define a mold cavity 18 therebetween. A passageway 19 is provided between mold cavity 18 and discharge orifice 15. Passageway 19 is in alignment with discharge orifice 15 of barrel 12 to provide communication between the end of barrel 12 and mold cavity 18.

Screw 13 is driven by means of a motor 20 which drives a pinion 21 which is, in turn, in intermeshing relation with a gear 22 keyed to the end of screw 13. Motor 20 can be either of the hydraulic or the electric type, the one illustrated herein being electric.

As screw 13 rotates and causes plasticated material to be transported forwardly in barrel 12 (to the right as shown in FIG. 1), the accumulation of the plasticated material at the forward end of the barrel forces screw 13 rearwardly until a point is reached at which the volume of plasticated material within the barrel and ahead of the screw is substantially equal to the volume of mold cavity 18. At that point motor 20 is stopped, thus stopping the rotation of screw 13, and hydraulic pressure is applied to a piston 23 attached to the rearmost portion 24 of screw 13 and slidably positioned within a cylinder 25. The hydraulic pressure, which can be applied through fitting 26, forces screw 13 forwardly again, thereby injecting the plasticated material into mold cavity 18 when the shut-off valve (not shown) at the forward end of barrel 12 is opened, whereupon the plastication cycle is repeated once again as the material in mold cavity 18 is permitted to cool and thereby solidify.

Motor 20 is energized by an electrical power supply 42 through wires 38, 40. Current flows in wires 38, 40 whenever contacts 28 are closed. Contacts 28, in turn, may be controlled by any suitable device such as solenoid 36 which may be energized upon the command of a controller (not shown).

Wires 46 and 48 provide an input to computer 30 when contacts 28 are closed, thus indicating that motor 20 is energized and that screw 13 is turning. Computer 30 is programmed to measure the length of time that motor 20 is energized and screw 13 is turning. As noted above, this operation continues until the volume of plasticated material within the barrel and ahead of the screw is sufficient for the next shot. The length of time for this to occur is called the "screw recovery time" and it depends upon many factors, as noted above.

Computer 30 is also programmed to store a suitable number, say about 50, of measured screw recovery times. After about 5 of these measured times have been stored, computer 30 calculates a mean screw recovery time and a process stability rating such as a coefficient of variation. The coefficient of variation (C.V.), expressed as a percent, is computed according to the following formula:

$$C.V. (\%) = 100 \text{ (standard deviation/mean)}$$

wherein the term "standard deviation" is used in the conventional sense familiar to those skilled in the art of process statistics. As each subsequent screw recovery time is measured, the mean and the coefficient of variation are updated. This updating continues until a statistically satisfactory number of them have been processed. Our present embodiment of this invention, for example, uses 50 measured screw recovery times and as each new time is incorporated in the calculations, the oldest is deleted therefrom.

It is possible to program computer 30 to measure screw recovery time in only selected molding cycles, such as in every tenth cycle. It is also possible to program the computer to intermittently measure batches of consecutive molding cycles or to take measurements in any other desired pattern.

Based upon a desired level of product quality and experience, the operator of an injection molding machine can select a value of the coefficient of variation as a benchmark indicating acceptable process stability. Our studies generally indicate that a coefficient of variation greater than 1% in most injection molding machines is indicative of some form of anomalistic behavior. Thus, the system can be programmed to output an alarm signal 36 whenever the coefficient of variation exceeds 1%, thus alerting an operator to possible operating problems. The system can also be integrated with the injection molding machine operation and signal 36 can be used to activate a sorter for segregating subsequently molded parts or to terminate operation of the injection molding machine.

As an alternative to the use of the coefficient of variation, it may be desirable to compute a signal to noise ratio. This is a Taguchi derived technique, well known to those skilled in the art, for calculating a simple process variability rating which, for many operators, is often much easier to compare or interpret than the coefficient of variation. It is derived from a plurality of measured screw recovery times and calculated according to the following formula:

$$S/N \text{ ratio} = 20 \text{ [Log 10 (mean/standard deviation)]}$$

The S/N ratio so computed is expressed in decibels (dB) and, again, a benchmark value such as 40 dB may be established as a level above which anomalistic machine behavior is indicated.

Figure 2:
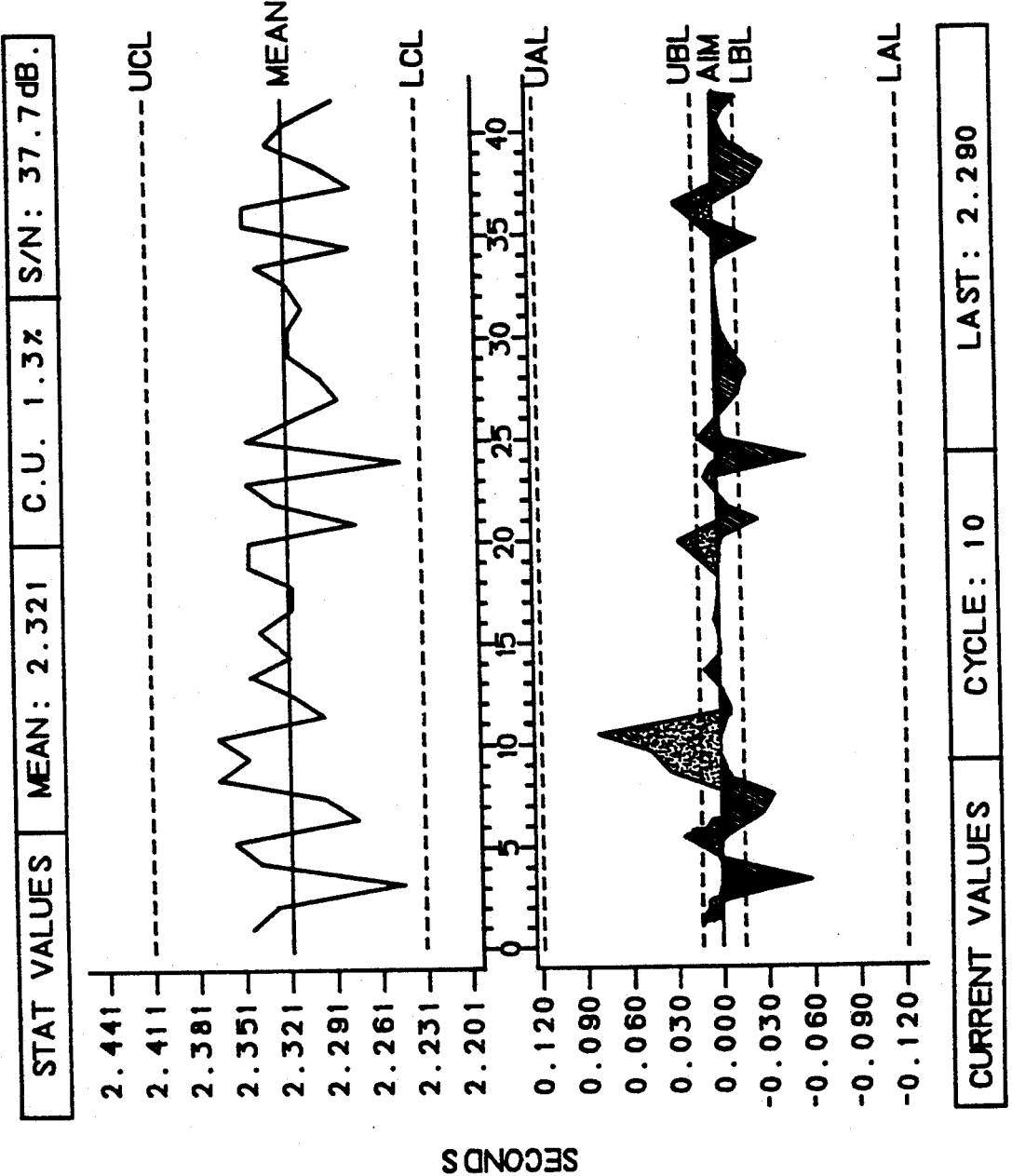
FIG. 2 is an example of a display which can be generated and employed with the invention.

FIG. 1 shows that the computer 30 may be used to drive a visual presentation along with the statistical data being collected. By way of example, the visual presentations may consist of a trend chart 32 and a CUSUM chart 34. FIG. 2 illustrates a typical display of a type which can be generated from the measured and stored screw recovery times. The chart shown in the upper half of FIG. 2 is a trend chart wherein each measured screw recovery time is plotted with respect to a mean value shown as the center line. The mean value is computed from the data points shown on the chart. The vertical scale is approximately 8 standard deviations and the two lines labeled "UCL" and "LCL" are ±3 standard deviation lines. Also shown in the upper half of FIG. 2 are statistical values labeled "stat values" including the computed mean screw recovery time, coefficient of variation (C.V.) and the signal to noise ratio (S/N). The trend chart is useful in that a skilled operator, by examining same, can often identify process anomalies which are occurring. For example, if the plotted data appears to indicate that the machine is cycling with respect to the mean, there is a strong likelihood that it is caused by an improperly functioning temperature controller. A sharp discontinuity in the mean usually indicates a major significant process change arising either from a sudden mechanical malfunction or operator intervention. Data which indicates a trend is usually caused by a "warm-up" related condition or anomalies in the utilities supplying the machine.

The lower half of FIG. 2 includes a cumulative sum (CUSUM) approach in which process variations are magnified statistically. A cumulative sum (CUSUM) statistical control scheme monitors cumulative evidence of a process drift or shift by using the sum of deviations of the observations from a reference point. The lines labeled UBL and LBL in the display are typically calculated as ±0.5 process standard deviations around the aim, the aim being analogous to the mean in the trend chart shown in the upper half of FIG. 2. These limits serve as reference points for calculating the cumulative sums of deviations which are then presented as shown. The lines labeled UAL and LAL are action limits and may, for example, be ±4 standard deviations with respect to the aim line. Should the cumulative sum exceed either of these action limits, the process would be considered "off aim", thus indicating to an operator that corrective measures are required.

Also shown in the lower half of FIG. 2 are the current values showing the number of the machine cycle currently being plotted and the last screw recovery time measured by the system.

The coefficient of variation and the signal to noise ratio computations set forth above provide an excellent technique for rating the level of variability of the process. Both values are continuously computed and displayed in association with the trend chart. Use of this technique of normalization provides two advantages. First, grossly differing processes can be immediately compared. For example, a process having a screw recovery time of one second can be evaluated on the same basis as a process having a screw recovery time of ten seconds. Secondly, the evaluation process can be automatically implemented, once a suitable benchmark has been chosen such as a 1% coefficient of variation or a 40 decibel level in the signal to noise ratio. If the chosen benchmark is exceeded, an alarm can be generated, thus alerting an operator to possible operating problems. Alternatively, a sorting device can be activated so that products molded after the benchmark is exceeded will be segregated from those made prior to that event.

The coefficient of variation and the signal to noise ratio calculations are but two of a number of methods which can be used to establish a process variability rating for an injection molding machine. They may very properly be thought of as establishing upper and lower limits for the screw recovery time. For when the screw recovery time in a subsequent cycle is so long or so short as to cause the resulting updated coefficient of variation or the signal to noise ratio to exceed the preselected benchmark values, then anomalistic behavior is indicated and appropriate action must be taken.

There exists in many molding shops production management systems that function typically by having a pair of wires from each machine connected to a central computer and a signal of some type transmitted to the computer each time the machine cycles. The duration of the time between the signals is used by the computer to monitor cycle time, alarm for cycle drifts, parts counting and assorted other management and supervisory functions. The signal control point for this management computer may be moved to the signal control point for the screw recovery time. Thus, the management information may be obtained by measuring the time duration between the start of each screw recovery time period. In addition, the signal duration is also measured. Thus, a second process-related signal is simultaneously obtained over the same set of wires. The same computer used for management information can be used for the analysis of screw recovery time or a separate computer dedicated to that analysis can be used.

It should be understood that trend charts and CUSUM charts of the types illustrated in FIG. 2 are generated by computer 30 using commercially available software familiar to those in the art of process engineering and statistics. Accordingly, their operation need not be detailed here. It should be further understood that these charts and the approach described above for statistically treating the measured screw recovery times is but one method for doing so. Other statistical approaches and forms of displaying data can easily be substituted. The essential point, however, is that the repeated measurement and study of screw recovery time in an injection molding machine provides a low cost, simple way of monitoring the stability of operation of an injection molding machine.

Various other changes can be made in the embodiment described above without departing from the scope of this invention which is intended to be defined by the following claims. For example, other devices for detecting and measuring the screw recovery time may be substituted for those described above.

We claim:

1. A method for monitoring the stability of the operation of a continuously operating injection molding machine, said machine having a reciprocably translatable plasticating screw disposed therein which is rotated in each molding cycle during a recovery period following each injection operation until a desired amount of molding material has been plasticated and positioned for the next injection operation, said method comprising the steps of:
   generating a signal when the screw is rotating;
   separately measuring and storing a time duration value for said signal during selected molding cycles;
   computing upper and lower time duration limits from a plurality of said stored time duration values;
   comparing each subsequently measured time duration value with said upper and lower time duration limits; and
   initiating an alarm when the measured time duration value falls outside the upper and lower limits.

2. The method of claim 1 further comprising the steps of computing a mean time duration value from a plurality of stored values and graphically displaying said plurality of stored values with respect to the computed mean time duration value.

3. The method of claim 1 or 2 wherein the alarm initiating step includes the step of terminating the operation of the injection molding machine being monitored.

4. The method of claim 1 or 2 wherein the alarm initiating step includes the step of activating a sorting device for segregating molded articles made during a molding cycle in which the measured time duration value of said signal falls outside the predetermined limits.

5. A method for operating an injection molding machine having a reciprocably translatable plasticating screw disposed therein, said method comprising the steps of:
   rotating the screw until a predetermined amount of molding material has been plasticated and positioned for injection;
   detecting when the screw is rotating and measuring and storing a time duration value of rotation during selected molding cycles;
   computing upper and lower time duration limits from a plurality of said stored time duration values;
   comparing each subsequently measured time duration value with said upper and lower time duration limits; and initiating an alarm when the measured time duration value falls outside the upper and lower limits.

6. The method of claim 5 further comprising the steps of computing a mean time duration value from a plurality of stored values and graphically displaying said plurality of stored values with respect to the computed mean time duration value.

7. The method of claim 5 or 6 wherein the alarm initiating step includes the step of terminating operation of the injection molding machine.

8. The method of claim 5 or 6 wherein the alarm initiating step includes the step of activating a sorting device for segregating molded articles made during a molding cycle in which the measured time duration value of screw rotation falls outside the predetermined limits.

9. A method for monitoring the stability of the operation of a continuously operating injection molding machine, said machine having a reciprocably translatable plasticating screw disposed therein which is rotated in each molding cycle during a recovery period following each injection operation until a desired amount of molding material has been plasticated and positioned for the next injection operation, said method comprising the steps of:
   generating a signal when the screw is rotating;
   separately measuring and storing a time duration value for said signal during selected molding cycles;
   computing from a plurality of the stored time duration values a process variability rating; and
   initiating an alarm when the process variability rating exceeds a predetermined value.

10. The method of claim 9 further comprising the steps of computing a mean time duration value from a plurality of the stored time duration values and graphically displaying said plurality of stored values with respect to the computed mean time duration value.

11. The method of claim 9 or 10 further comprising the step of displaying the computed process variability rating.

12. The method of claim 9 wherein the alarm initiating step includes the step of terminating the operation of the injection molding machine being monitored.

13. The method of claim 9 wherein the alarm initiating step includes the step of activating a sorting device for segregating subsequently molded articles.

14. A method for operating an injection molding machine having a reciprocably translatable plasticating screw disposed therein, said method comprising the steps of:
   rotating the screw until a predetermined amount of molding material has been plasticated and positioned for injection;
   detecting when the screw is rotating and measuring and storing the time duration value of rotation during selected molding cycles;
   computing from a plurality of the stored time duration values a process variability rating; and
   initiating an alarm when the process variability rating exceeds a predetermined value.

15. The method of claim 14 further comprising the steps of computing a mean time duration value from a plurality of the stored time duration values and graphically displaying said plurality of stored values with respect to the computed mean time duration value.

16. The method of claim 14 or 15 further comprising the step of displaying the computed process variability rating.

17. The method of claim 14 wherein the alarm initiating step includes the step of terminating the operation of the injection molding machine.

18. The method of claim 14 wherein the alarm initiating step includes the step of activating a sorting device for segregating subsequently molded articles.

19. Apparatus for monitoring the stability of the operation of a continuously operating injection molding machine, said machine having a reciprocably translatable plasticating screw disposed therein which is rotated in each molding cycle during a recovery period following each injection operation until a desired amount of molding material has been plasticated and positioned for the next injection operation, said system comprising:
   means for generating a signal when the screw is rotating;
   means for separately measuring and storing a time duration value for said signal during selected molding cycles;
   means for computing upper and lower time duration limits from a plurality of said stored time duration values;
   means for comparing each subsequently measured time duration value with said upper and lower time duration limits; and
   means for initiating an alarm when the measured time duration value falls outside the predetermined limits.

20. The apparatus of claim 19 further comprising means for computing a mean time duration value from a plurality of stored values and means for graphically displaying said plurality of stored values with respect to the computed mean time duration value.

21. The apparatus of claim 19 or 20 wherein the alarm initiating means includes means for terminating the operation of the injection molding machine being monitored.

22. The apparatus of claim 19 or 20 wherein the alarm initiating means includes means for activating a sorting device for segregating molded articles made during a molding cycle in which the measured time duration value of said signal falls outside the predetermined limits.

23. An injection molding machine comprised of:
   a barrel having a reciprocably translatable screw disposed therein for plasticating molding material;
   means for rotating the screw until a predetermined amount of molding material has been plasticated and positioned for injection;
   means for detecting when the screw is rotating and for measuring and storing a time duration value for rotation of the screw during selected molding cycles;
   means for computing upper and lower time duration limits from a plurality of said stored time duration values;
   means for comparing each subsequently measured time duration value with said upper and lower time duration limits; and
   means for initiating an alarm when the measured time duration value falls outside the predetermined limits.

24. The machine of claim 23 wherein the computing means includes means for computing a mean time duration value from a plurality of stored values and wherein the system further comprises means for graphically displaying said plurality of stored values with respect to the computed mean time duration value.

25. The machine of claim 23 or 24 wherein the alarm initiating means includes means for terminating the operation of the injection molding machine being monitored.

26. The machine of claim 23 or 24 wherein the alarm initiating means includes means for activating a sorting device for segregating molded articles made during a molding cycle in which the measured time duration value of said signal falls outside the predetermined limits.

27. Apparatus for monitoring the stability of the operation of a continuously operating injection molding machine, said machine having a reciprocably translatable plasticating screw disposed therein which is rotated in each molding cycle during a recovery period following each injection operation until a desired amount of molding material has been plasticated and positioned for the next injection operation, said apparatus comprising:
   means for generating a signal when the screw is rotating;
   means for separately measuring and storing a time duration value for said signal during selected molding cycles;
   means for computing from a plurality of the stored time duration values a process variability rating; and
   means for initiating an alarm when the process variability rating exceeds a predetermined value.

28. The apparatus of claim 27 further comprising means for computing a mean time duration value from a plurality of the stored time duration values and for graphically displaying said plurality of stored values with respect to the computed mean time duration value.

29. The apparatus of claim 27 or 28 further comprising means for displaying the computed process variability rating.

30. The apparatus of claim 27 wherein the alarm initiating means includes means for terminating the operation of the injection molding machine being monitored.

31. The apparatus of claim 27 wherein the alarm initiating means includes means for activating a sorting device for segregating subsequently molded articles.

32. An injection molding machine comprised of:
   a barrel having a reciprocably translatable screw disposed therein for plasticating molding material;
   means for rotating the screw until a predetermined amount of molding material has been plasticated and positioned for injection;
   means for detecting when the screw is rotating and for measuring and storing the time duration value of rotation during selected molding cycles;
   means for computing from a plurality of the stored time duration values a process variability rating; and
   means for initiating an alarm when the process variability rating exceeds a predetermined value.

33. The machine of claim 32 further comprising means for computing a mean time duration value from a plurality of the stored time duration values and for graphically displaying said plurality of stored values with respect to the computed mean time duration value.

34. The machine of claim 32 or 33 further comprising means for displaying the computed process variability rating.

35. The machine of claim 32 wherein the alarm initiating means includes means for terminating the operation of the injection molding machine being monitored.

36. The machine of claim 32 wherein the alarm initiating means includes means for activating a sorting device for segregating subsequently molded articles.

* * * * *